US006187443B1

United States Patent
Mariaggi et al.

(10) Patent No.: US 6,187,443 B1
(45) Date of Patent: Feb. 13, 2001

(54) THERMOSETTING COMPOSITION, USES THEREOF AND A FLEXIBLE DEPLOYABLE PREFORM COMPRISING THE COMPOSITION

(75) Inventors: Paul Mariaggi, Seyssuel; Henri Delhomme, Sainte Foy les Lyons; Dominique Audigier, Brignais; Frédérique Jacquemin-Hauviller, Saint Genis Laval, all of (FR)

(73) Assignee: Institut Francais du Petrole, Rueil-Malmaison (FR)

( * ) Notice: Under 35 U.S.C. 154(b), the term of this patent shall be extended for 0 days.

(21) Appl. No.: 08/940,947

(22) Filed: Sep. 30, 1997

(30) Foreign Application Priority Data

Sep. 30, 1996 (FR) .................................. 96 11990

(51) Int. Cl.$^7$ .................................................. B32B 27/38
(52) U.S. Cl. .......................... 428/418; 523/455; 523/461; 528/124
(58) Field of Search .................................. 523/455, 461; 528/124; 428/418

(56) References Cited

U.S. PATENT DOCUMENTS

| 3,179,168 | 4/1965 | Vincent | 166/14 |
| 3,297,092 | 1/1967 | Jennings | 166/207 |
| 3,427,282 | 2/1969 | Sundholm | 260/47 |
| 3,481,900 | * 12/1969 | Sundholm | 528/124 |
| 4,366,108 | 12/1982 | Urech et al. | 264/137 |
| 4,447,586 | 5/1984 | Shimp | 525/504 |
| 5,488,163 | 1/1996 | Hardt et al. | 564/315 |
| 5,728,755 | * 3/1998 | Weigel et al. | 523/457 |

FOREIGN PATENT DOCUMENTS 803547    10/1958   (GB) .

OTHER PUBLICATIONS

EP 122149—English Abstract.
FR 2487371—English Abstract.
FR 1378591—English Abstract.
FR 1562289—English Abstract.
EP 594156—English Abstract.
WO 9425655—English Abstract.
WO 9118180—English Abstract.

* cited by examiner

Primary Examiner—Robert Dawson
Assistant Examiner—D. Aylward
(74) Attorney, Agent, or Firm—Millen White Zelano & Branigan

(57) ABSTRACT

A thermosetting composition with a glass transition temperature of at least 100° C. comprises at least one epoxy resin formed from at least one polyepoxide containing at least two epoxy groups in its molecule and at least one aromatic polyamine containing at least two primary amino groups in its molecule, at least one alkyl substituent containing 1 to 12 carbon atoms located in the position alpha to one of the amino groups. The molar ratio of the amine to the epoxide is such that each amine group corresponds to 1.6 to 2.6 epoxy groups. The composition also includes a flow regenerator. The composition can be used as a protective coating for any metallic or non metallic surface. The invention also concerns a flexible deployable preform comprising the composition.

19 Claims, No Drawings

US 6,187,443 B1

THERMOSETTING COMPOSITION, USES THEREOF AND A FLEXIBLE DEPLOYABLE PREFORM COMPRISING THE COMPOSITION

FIELD OF THE INVENTION

The present invention concerns a flexible preform which is radially deployable to form a tubular structure which is hardenable following deployment after positioning in a well or conduit to mould to its shape, to constitute a casing which is usually substantially cylindrical and to thermosetting composition starting materials.

BACKGROUND OF THE INVENTION

Preforms are known with walls of flexible material which can be collapsed on itself to give a radial dimension which is much smaller than the diameter of the well or conduit to be cased in the event of local repair of a well or casing. The preform is introduced into the well or conduit in its collapsed state and once it is in the desired position, it is deployed by radial outward deformation, for example by introducing an inflating fluid such as a gas or liquid inside the preform. The applied pressure causes it to mould to the shape of the well or conduit. Such preforms normally comprise a thermosetting resin. In general, the resin forms part of the constituting wall of the preform and is very often introduced by impregnating the fibres forming the wall. Hardening the resin by thermosetting may be brought about by the temperature in the well, but normally it is caused either by introducing a hot fluid inside the preform or by a Joule effect using suitable electrical resistors located in the preform, for example electric wires forming part of the frame of the preform wall, impregnated with thermosetting resin. The heat released by an exothermic reaction which is initiated inside the preform can also be used, usually by bringing the reactants into contact at the desired time.

SUMMARY OF THE INVENTION

The preform of the present invention can be positioned and anchored without the need for cement. Within the context of the present invention, the term "flexible preform" means any assembly preferably having an integrated heating system which can hold a thermosetting resin in a medium confined between outer and inner skins of elastic material. Preforms of this type are described, for example, in French patent FR-A-2 722 239, and International patents WO-A-94/21887, WO-A-94/18180 and WO-A-94/25655. The contents of these patents are hereby incorporated by reference and are considered to form an integral part of the present description.

Such preforms must comprise a thermosetting resin having particular characteristics. The resin used must confer superior mechanical properties on the preform, in particular when used in wells, especially in oil wells, they must have high resistance to hydrothermal and chemical ageing, they must have as small as possible a water take-up and the highest possible latency, to allow storage and transport of the preform before it is put in position without the polymerisation reaction starting or having advanced too far.

The present invention also concerns thermosetting compositions with improved latency, with a low water take-up, having a glass transition temperature of at least 100° C., preferably at least 120° C. and more preferably at least 140° C., comprising at least one epoxy resin formed from at least one polyepoxide containing at least two epoxy groups in its molecule and at least one aromatic polyamine containing at least two primary amino groups in its molecule and at least one alkyl substituent containing 1 to 12 carbon atoms located in the position alpha to one of the amino groups, the molar ratio of the amine to the epoxide being such that each amino group corresponds to 1.6 to 2.6 epoxy groups, the thermosetting compositions of the invention further comprising a flow regulator.

The present invention also concerns the use of these compositions for the production of pre-impregnates with high latency in processes demanding intermediate steps of several hours at 80° C. and the use of these compositions as protective coatings in conduits for fluids (liquid, gas or a mixture of liquid and gas), in particular transport conduits for liquid and/or gaseous hydrocarbons. These coatings can be applied to the inside and also to the outside of the conduits. The invention further concerns the use of these compositions as protective coatings for storage facilities. In general terms, the invention concerns the use of these compositions as a protective coating for any metallic or non metallic surface which can come into contact with agents which cause the degradation of a material or the surface of a material when they come into contact with the surface of the material. More precisely, this is the case for any surface which comes into contact with a corrosive atmosphere or with an adsorbable or absorbable product causing swelling of the material. In the case of conduits or storage facilities for hydrocarbons, these coatings, which have a very low water adsorption capacity, can prevent corrosion by water by preventing direct contact between the material and water or humidity contained in the product in contact with the material, which can be earth in the case of buried conduits or facilities, air in the case of above-ground conduits or facilities, or the moisture contained in hydrocarbons. The scope of the invention also includes the use of these compositions in the micro-electronics field and in the electromechanical field, two fields in which a very low water adsorption capacity is an important factor.

The choice of aromatic polyamines used in the present invention is guided in particular by the fact that it is desirable to have access to aromatic polyamines with low reactivity and low solubility at a temperature of less than about 90° C., occasionally less than about 40° C., in the epoxy resins used. The choice is also influenced by the fact that these aromatic polyamines must preferably result in good resistance to hydrolysis by secondary and tertiary amine moieties which it generates by reaction on the epoxide ring. It must also result in good temperature resistance properties.

In its widest form, then, the present invention concerns a radially deployable flexible preform which forms a tubular structure which is hardenable following deployment after positioning in a well or a conduit to mould to its shape, characterized in that it comprises at least one epoxy resin formed from at least one polyepoxide containing at least two epoxy groups in its molecule, and at least one aromatic polyamine containing at least two primary amino groups in its molecule and at least one alkyl substituent containing 1 to 12 carbon atoms located in the position alpha to one of the amino groups, the molar ratio of the amine to the epoxide being such that each amino group corresponds to 1.6 to 2.6 epoxy groups.

Processes using aromatic polyamines as hardeners for certain epoxy resins are known in the industry, such as the various types of ARALDITE®, EPIKOTE® resins, EPON® resins, the resin obtained from the diglycidylether of bisphenol-F (hereinafter abbreviated to DGEBF) and, in particular, the resin obtained from the diglycidylether of bis-phenol-A (hereinafter abbreviated to DGEBA). In these processes, express recommendations are made that the amine be dissolved before impregnation into the reinforcing fibre, for example glass fibre, carbon fibre, ceramic fibre or a natural or synthetic fibre. The skilled person is aware that practically any aromatic polyamine can be used as an epoxy resin hardener. Selection of a limited number of polyamines which could produce the required properties for the preforms of the invention would thus not be obvious.

The epoxy resin can be selected from the group formed by the commercially available resins cited above, the diglycidylether of bis-phenol-A or bis-phenol-F, bis-phenol formol resin, phenol-novolac resin, cycloaliphatic resins, tri- or tetra-functional resins, resins formed from triglycidylether-isocyanurate and/or triglycidylether-cyanurate and/or triglycidyl-cyanurate and/or triglycidyl-isocyanurate, or mixtures of at least two of these resins.

The epoxy resins obtained from the epoxy resins cited in United States patent U.S. Pat. No. 4,921,047 can also be used within the context of the present invention. The content of this patent is hereby incorporated by reference and is considered to form an integral part of the present description.

The epoxy resin selected usually has a dynamic viscosity of about 0.04 to about 50 Pa.s at about 25° C.

Of the amines which could achieve the fixed technical specifications for the preforms, aromatic amines containing a single aromatic ring could be considered. However, it is preferable in the present invention to use aromatic amines containing at least two aromatic rings. In this case, these amines often contain two aromatic rings connected together via a bivalent substituted or unsubstituted hydrocarbon residue containing 1 to 18 carbon atoms. These two aromatic rings are either connected by a bivalent alkyl group or are connected together via a bivalent substituted or unsubstituted hydrocarbon residue containing 6 to 18 carbon atoms and containing an aromatic ring.

The amine can also comprise at least one substituent selected from the group formed by fluorine, iodine, bromine and chlorine. It preferably contains at least two alkoyl substituents, each being alpha either side of an amino group.

When the two aromatic rings are connected by a bivalent alkyl residue, the residue is preferably an unsubstituted methylidene group, or a methylidene group substituted by at least one radical selected from alkyl radicals and haloalkyl radicals containing 1 to 3 carbon atoms. As an example, the alkyl residue can be selected from the group formed by the methylidene group, the isopropylidene group, halogenoisopropylidene groups, and the hexafluoroisopropylidene group. In this case, the amine is preferably selected from the group formed by:

4,4'-methylene-bis(2,6-dimethylaniline), or M-DMA;
4,4'-methylene-bis(2-isopropyl-6-methylaniline), or M-MIPA;
4,4'-methylene-bis(2,6-diethylaniline), or M-DEA;
4,4'-methylene-bis(2,6-diisopropylaniline), or M-DIPA; and
4,4'-methylene-bis(3-chloro-2,6-diethylaniline), or M-CDEA.

Of these amines, 4,4'-methylene-bis(2,6-diethylaniline) and 4,4'-methylene-bis(3-chloro-2,6-diethylaniline) are of particular interest.

When the amine contains two aromatic rings which are connected together via a bivalent substituted or unsubstituted hydrocarbon residue containing 6 to 18 carbon atoms and containing an aromatic ring, it is preferably selected from the group formed by:

4,4'-(phenylene-diisopropyl)-bis(2,6-dimethylaniline);
4,4'-(phenylene-diisopropyl)-bis(2,6-diethylaniline);
4,4'-(phenylene-diisopropyl)-bis(2,6-dipropylaniline);
4,4'-(phenylene-diisopropyl)-bis(2,6-diisopropylaniline);
4,4'-(phenylene-diisopropyl)-bis(2,6-dimethyl-3-chloroaniline);
4,4'-(phenylene-diisopropyl)-bis(2,6-diethyl-3-chloroaniline);
4,4'-(phenylene-diisopropyl)-bis(2,6-dipropyl-3-chloroaniline);
4,4'-(phenylene-diisopropyl)-bis(2,6-diisopropyl-3-chloroaniline);
3,3'-(phenylene-diisopropyl)-bis(2,6-dimethylaniline);
3,3'-(phenylene-diisopropyl)-bis(2,6-diethylaniline);
3,3'-(phenylene-diisopropyl)-bis(2,6-dipropylaniline);
3,3'-(phenylene-diisopropyl)-bis(2,6-dimethyl-3-chloroaniline);
3,3'-(phenylene-diisopropyl)-bis(2,6-diethyl-3-chloroaniline);
3,3'-(phenylene-diisopropyl)-bis(2,6-dipropyl-3-chioroaniline);
3,3'-(phenylene-diisopropyl)-bis(2,6-diisopropyl aniline); and
3,3'-(phenylene-diisopropyl)-bis(2,6-diisopropyl-3-chloroaniline).

In a particular embodiment of the invention, the preform comprises at least one epoxy resin formed from at least one polyepoxide containing at least two epoxy groups in its molecule, and at least two aromatic polyamines.

The compositions of the present invention must satisfy the following conditions of use in order to be able to be used for the production of flexible preforms of the present invention:

They must be capable of providing a pot life, either stored or on the reinforcing fibres, for example glass fibres or their equivalent, of 20 days or more, normally about 30 days to about 4 months, more specifically about 30 days to about 2 months and at an average storage temperature of 25° C. or less, normally about 0° C. to about 15° C. and more preferably about 0C. to about 5° C.;

They must be capable of providing a residual latency of at least 3 hours, preferably at least 6 hours, after pot storage or storage on a support, at a temperature of about 70° C. to about 90° C., normally at least 8 hours at a temperature of about 80° C. The residual latency is more preferably at least 5 hours at 100° C. (or even 120° C.), preferably at least 7 hours at that temperature;

They must be capable of providing a residual latency of at least 8 hours, preferably at least 10 hours and more preferably at least 11 hours, at a temperature of about 70° C. to about 90° C., more preferably about 80° C., after pot storage or storage on a support for a period of at least 90 days, normally about 90 days to about 6 months and more preferably about 90 days to about 4 months at a temperature of −18° C. or less, normally about −30° C. to about −18° C. and more preferably about −25° C. to about −18° C.;

They must be capable of being deposited on fibrous supports such as glass fibres, carbon fibres, KEVLAR® fibres, on metal fibres or wires, on ceramic fibres or on natural or synthetic fibres in conventional fashion, whether manually or mechanically. This means that compositions having a relatively low dynamic viscosity, to allow good impregnation of the fibres forming the walls of the preform, must be selected. This dynamic viscosity is at the temperature used for impregnating the fibres, often less than 2500 mPa.s (millipascals second) and normally about 300 to about 2500 mPa.s; it can be of the order of 1500 mPa.s;

It must satisfy hygiene and safety regulations;

It must have a polymerisation temperature which is compatible with the heat resistance of the polymers constituting the walls of the preform, i.e., normally a polymerisation temperature of 170° C. or less, usually 160° C. or less;

It must have a polymerisation time which is as small as possible at the desired polymerisation temperature, for example at most 9 hours at 140° C., preferably at most 8 hours. This time is, for example, at most 7 hours at 150° C. or at most 6 hours at 160° C. The polymerisation time is often at most 6 hours at 150° C. or at most 5 hours at 160° C.

The requirements mentioned above imply that the formulations used do not contain a polymerisation accelerator.

Water adsorption, which is an important selection criterion within the context of the present invention, is less than 3% at 80° C. and usually less than 3% at 100° C. This adsorption is preferably less than 2% at these temperatures.

Further, petroleum absorption is generally less than 0.3% at 100° C. (API fuel, type II).

The compositions of the invention contain a flow regulator. This additive prevents flow of the resin by drainage during hot pressing of several impregnated layers, and also conserves the fibre/matrix volume ratio, which is preferably about 1:1. This ratio is that which produces the best mechanical properties in the composites after polymerisation. This additive can be added using two main methods. The flow regulator can be added when mixing the epoxide and the hardener (i.e., before polymerisation). The flow regulator is normally selected from the group formed by polyethersulphone type, polyamide type, polyimide type and polyarylsulphone type polymers. The proportion of the flow regulator is normally about 1% to 15% by weight with respect to the final composition weight. These polymers can be mixed using a solvent and, in this case, the epoxide, the hardener and the polymer are in solution on mixing and the solvent is evaporated off after impregnating the walls of the preform. A solvent does not need to be used. In this case, the flow regulator is added in two phases:

1) dissolving in the epoxy resin; then
2) adding the amine hardener to this mixture.

Within the context of the present invention, a very reactive hardener can be added to the composition (i.e., a hardener with a reactivity which is higher than the principal hardener and normally very much higher) in small proportions, for example about 1% to 15% by weight, more preferably about 1% to 10% by weight with respect to the total composition weight. In this case, the hardener is added at the last minute, just before impregnation and after adding the flow regulator. Thus the cross linking reaction takes place after impregnation and will not affect wetting of the material and will initiate the three-dimensional network with a high dynamic viscosity. The most latent hardener will only react later on heating, for example at 80° C. or more, and will terminate cross linking of the resin.

The compositions of the present invention may comprise a proportion of primary aromatic polyamine of about 20 to about 60 parts by weight per 100 parts of epoxy resin, preferably about 25 to about 55 parts per 100 parts of epoxy resin.

With the aim of showing the main advantages brought about by the choice of formulations of the present invention which are described in Examples 2, 3, 4, 5, 7, 8 and 9 below (comprising a flow regulator) over formulations which do not contain a flow regulator (Examples 1 and 6) and over a prior art formulation (European patent EP-A-0 211 214) comprising 4,4'-diaminodiphenylsulphone (DDS) as a hardener described in comparative Example 10 below, tests were carried out the results of which are shown in Table 2 below. These tests included determining the gel time at three temperatures: 80° C., 90° C. and 100° C. The gel time is the time required at the chosen temperature for a given composition to produce a degree of polymerisation $X_g$. This degree of polymerisation $X_g$ at the gel point is an important factor as it is linked to a major rheological change due to the irreversible transformation of a viscous liquid to a viscoelastic gel. The gel time is measured using an apparatus sold by PRODEMAT with the trade name TROMBOMAT® which can determine the gel point and evaluate the reactivity of the hardener from the reaction kinetics.

The dynamic viscosity was measured at 90° C. using a PK100® cone-and-plate viscometer sold by HAAKE.

The glass transition temperature was measured using a KINEMAT® apparatus sold by PRODEMAT. The rate of temperature increase was 2° C. per minute from 20° C. to 250° C. the glass transition temperature marks the passage from the glassy state to the rubbery state and thus determines the temperature limits of use for the epoxy resins described in Examples 1 to 10. The glass transition temperature measurements were carried out on polymerised samples at 140° C. over 8 hours.

Water absorption for epoxy resins manifests itself as a gradual variation in the stiffness of the cross linked network. Fixation of water causes a change in the glass transition temperature and encourages hydrolytic degradation of the epoxy resin and the interfaces between the reinforcing fibres in the walls of the preform. It is thus important that the water absorption of epoxides hardened by aromatic polyamines is as small as possible. Comparative water absorption measurements were carried out on 50×25×5 millimetre resin samples which had been polymerised for 8 hours at 140° C., then impregnated to saturation in distilled water at 100° C. Water absorption was measured by the difference in mass at regular intervals until saturation was obtained, i.e., to constant weight, giving the water take-up in percent by weight shown in Table 2 for each composition of Examples 1 to 10.

It is clear that, surprisingly, the compositions of the present invention have a substantially lower water take-up than the water take-up of the reference composition of Example 10 and thus have an undeniable advantage.

The present invention will be better understood, and its advantages will become more clear, from the examples given below.

These tests were carried out using DGEBA epoxy resin manufactured and sold by CIBA under the trade name LY 556®. The principal characteristics of the resin are:

Dynamic viscosity at 25° C.: 12 Pa.s;

Epoxide content: 1.15 equivalents per kilogram; and

Density: 1.15 g/cm$^3$.

In order to satisfy the stoichiometry of the reaction, the theoretical quantity of hardener to be introduced into the mixture per 100 grams of epoxide prepolymer had to be calculated. This quantity was termed the "pwhr" (parts by weight per hundred grams of resin).

$$Pwhr = 100 \times \frac{\text{weight equivalent of amine}(*)}{\text{weight equivalent of epoxy}(*)}$$

(*) weight equivalent of reactive hydrogen

The weight equivalent of epoxy prepolymer was given by the supplier (CIBA): 5.32 equivalent epoxy per kg (i.e., 1000:5.32=187.79 g/mole).

The stoichiometry required the reaction of one molecule of epoxy prepolymer carrying two epoxy groups with two mobile hydrogens of the amine. The primary diamines used in the examples had four mobile hydrogens per molecule. The quantities of amines in pwhr for each amine used are shown in Table 1 below.

TABLE 1

| Amine hardeners | Molecular mass | pwhr |
| --- | --- | --- |
| M-CDEA | 379.38 | 50.5 |
| M-DEA | 310.49 | 41.33 |
| DDS | 248.31 | 33 |

EXAMPLES

The following examples illustrate the invention without limiting its scope. Examples 1, 6 and 10 are given by way of comparison.

The compositions tested were manufactured as described in Examples 1 to 10 below.

EXAMPLE 1 (comparative)

50.50 g of M-CDEA was added, with stirring, to 100 g of DGEBA heated to 90° C. Stirring was continued for about 20 minutes following complete dissolution. The temperature was then reduced to 4° C. to preserve the composition. The properties of this composition are shown in Table 2.

EXAMPLE 2

100 g of DGEBA was heated in an inert atmosphere to 140° C. At this temperature and with stirring, 12.44 g (i.e., 8% by weight with respect to the final formulation) of a polysulphone, sold by AMOCO under the trade name UDEL®, was added. Stirring and heating were continued until the polymer had completely dissolved. After dissolving, the temperature of the assembly was reduced to 80° C. 50.5 g of M-CDEA was then added until it was completely dissolved, about 20 minutes. The temperature of this formulation was then reduced to between 20° C. and 4° C. to preserve it. The properties of this composition are shown in Table 2.

EXAMPLE 3

100 g of DGEBA was heated in an inert atmosphere to 180° C. At this temperature and with stirring, 10.88 g (i.e., 7% by weight with respect to the final formulation) of a polyphenylsulphone, sold by AMOCO under the trade name RADEL®, was added. Stirring and heating were continued until the polymer had completely dissolved. After dissolving, the temperature of the assembly was reduced to 80° C. 50.5 g of M-CDEA was then added until it was completely dissolved, about 20 minutes. The temperature of this formulation was then reduced to between 20° C. and 4° C. to preserve it. The properties of this composition are shown in Table 2.

EXAMPLE 4

100 g of DGEBA was heated in an inert atmosphere to 150° C. At this temperature and with stirring, 12.44 g (i.e., 8% by weight with respect to the final formulation) of a polyetherimide, sold by General Electric under the trade name ULTEM 1000®, was added. Stirring and heating were continued until the polymer had completely dissolved. After dissolving, the temperature of the assembly was reduced to 80° C. 50.5 g of M-CDEA was then added until it was completely dissolved, about 20 minutes. The temperature of this formulation was then reduced to between 20° C. and 4° C. to preserve it. The properties of this composition are shown in Table 2.

EXAMPLE 5

100 g of DGEBA was heated to 180° C. At this temperature and with stirring, 45.44 g of M-CDEA was then added until it was completely dissolved (about 15 minutes). The solution obtained was cooled to 40° C. 3.173 g of the cycloaliphatic amine HY2954 from CIBA-GEIGY was then added. The total molarity of these two amines thus corresponded to the ideal stoichiometry. The final solution was then cooled to between 20° C. and 4° C. to preserve it. The properties of this composition are shown in Table 2.

EXAMPLE 6 (comparative)

41.33 g of M-DEA was added, with stirring, to 100 g of DGEBA heated to 80° C. Stirring was continued for about 30 minutes following complete dissolution. The temperature was then reduced to −18° C. to preserve the composition. The properties of this composition are shown in Table 2.

EXAMPLE 7

100 g of DGEBA was heated in an inert atmosphere to 140° C. At this temperature and with stirring, 12.44 g (i.e., 8% by weight with respect to the final formulation) of a polysulphone, sold by AMOCO under the trade name UDEL®, was added. Stirring and heating were continued until the polymer had completely dissolved. After dissolving, the temperature of the assembly was reduced to 80° C. 41.33 g of M-DEA was then added until it was completely dissolved, about 20 minutes. The temperature of this formulation was then reduced to between 20° C. and 4° C. to preserve it. The properties of this composition are shown in Table 2.

EXAMPLE 8

100 g of DGEBA was heated in an inert atmosphere to 180° C. At this temperature and with stirring, 10.88 g (i.e., 7% by weight with respect to the final formulation) of a polyphenylsulphone, sold by AMOCO under the trade name RADEL®, was added. Stirring and heating were continued until the polymer had completely dissolved. After dissolving, the temperature of the assembly was reduced to 80° C. 41.33 g of M-DEA was then added until it was completely dissolved, about 20 minutes. The temperature of this formulation was then reduced to between 20° C. and 4° C. to preserve it. The properties of this composition are shown in Table 2.

EXAMPLE 9

100 g of DGEBA was heated in an inert atmosphere to 150° C. At this temperature and with stirring, 12.44 g (i.e., 8% by weight with respect to the final formulation) of a polyetherimide, sold by General Electric under the trade name ULTEM 1000®, was added. Stirring and heating were continued until the polymer had completely dissolved. After dissolving, the temperature of the assembly was reduced to 80° C. 41.33 g of M-DEA was then added until it was completely dissolved, about 20 minutes. The temperature of this formulation was then reduced to between 20° C. and 4° C. to preserve it. The properties of this composition are shown in Table 2.

EXAMPLE 10 (comparative)

33.00 g of 4,4'-diaminodiphenylsulphone (DDS) was added, with stirring, to 100 g of DGEBA heated to 90° C. Stirring was continued for about 30 minutes following complete dissolution. The temperature was then reduced to −18° C. to preserve the composition. The properties of this composition are shown in Table 2.

The results of tests on these compositions are given in Table 2 below. The viscosity measured was the dynamic viscosity at 90° C. expressed in millipascals second. The glass transition temperature is in degrees Celsius and the water absorption was measured as described above, at 100° C. at saturation, after 10 000 hours.

TABLE 2

| Formulations | Gel time (hours) at 80° C. | Gel time (hours) at 90° C. | Gel time (hours) at 100° C. | Dynamic viscosity at 90° C. (mPa · s) | Glass transition (° C.) | Water absorption (%) at 100° C. after 10 000 h |
|---|---|---|---|---|---|---|
| M-CDEA | 39 | 22 | 15 | 70 | 151 | 1.92 |
| M-CDEA + UDEL (8%) | 38 | 21 | 14 | 1540 | 153 | 1.9 |
| M-CDEA + RADEL (7%) | 38 | 20 | 13 | 1600 | 150 | 1.9 |
| M-CDEA + ULTEM 1000 (8%) | 36.5 | 19 | 12 | 1600 | 155 | 1.9 |
| M-CDEA + HY2954 (10%) | 22 | 17 | 11 | 1700 | 155 | 1.9 |
| M-DEA | 12 | 8 | | 50 | 155 | 2.0 |
| M-DEA + UDEL (8%) | 11 | 7 | | 1500 | 156 | 1.9 |
| M-DEA + RADEL (7%) | 11 | 7 | | 1450 | 155 | 1.95 |
| M-DEA + ULTEM 1000 (8%) | 11.5 | 7.5 | | 1550 | 157 | 2.0 |
| DDS | 17 | 10 | 6 | 80 | 165 | 3.9 |

The results in Table 2 show that formulations containing a flow regulator increase the dynamic viscosity and prevent hot draining without affecting the basic qualities provided by amine hardeners. It should be noted that the formulation containing DDS absorbed a larger quantity of water than with the products of the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A thermosetting composition having a glass transition temperature of at least 100° C., comprising at least one epoxy resin formed from at least one polyepoxide containing at least two epoxy groups per molecule and at least one aromatic polyamine containing not more than two aromatic rings, at least two primary amino groups per molecule and at least one alkyl substituent containing 1 to 12 carbon atoms located in the position alpha to one of the amine groups, the molar ratio of the amine to the epoxide being such that each amino group corresponds to 1.6 to 2.6 epoxy groups, the thermosetting composition further comprising a flow controller.

2. A thermosetting composition according to claim 1, in which the flow controller is selected from the group consisting of polyethersulphones, polyamides, polyimides and polyarylsulphones.

3. A thermosetting composition according to claim 1, in which the proportion of the flow controller is about 1% to 15% by weight with respect to the final composition weight.

4. A thermosetting composition according to claim 1, in which the amine comprises at least one substituent selected from the group consisting of fluorine, iodine, bromine and chlorine.

5. A thermosetting composition according to claim 1, in which the amine comprises at least two alkyl substituents, each being alpha to either side of an amino group.

6. A thermosetting composition according to claim 1, in which the amine comprises a single aromatic ring.

7. A thermosetting composition according to claim 1, in which the amine comprises two aromatic rings.

8. A thermosetting composition according to claim 7, in which the amine contains two aromatic rings which are connected together by a bivalent substituted or unsubstituted hydrocarbon residue containing 1 to 18 carbon atoms.

9. A thermosetting composition according to claim 7, in which the amine comprises two aromatic rings connected by a bivalent alkyl group.

10. A thermosetting composition according to claim 7, in which the amine comprises two aromatic rings connected together by an unsubstituted methylidene group or by a methylidene group substituted by at least one radical selected from alkyl radicals and haloalkyl radicals containing 1 to 3 carbon atoms.

11. A thermosetting composition according to claim 10, in which the two aromatic rings are connected by a methylidene group, an isopropylidene group, halogenoisopropylidene groups, or a hexafluoroisopropylidene group.

12. A thermosetting composition according to claim 7, in which the amine is:
- 4,4'-methylene-bis(2,6-dimethylaniline);
- 4,4'-methylene-bis(2-isopropyl-6-methylaniline);
- 4,4'-methylene-bis(2,6-diethylaniline);
- 4,4'-methylene-bis(2,6-diisopropylaniline); or
- 4,4'-methylene-bis(3-chloro-2,6-diethylaniline).

13. A thermosetting composition according to claim 12, in which the amine is 4,4'-methylene-bis(2-isopropyl-6-methylaniline) or 4,4'-methylene-bis(3-chloro-2,6-diethylaniline).

14. A thermosetting composition according to claim 7, in which the amine comprises two aromatic rings which are connected together by a bivalent substituted or unsubstituted hydrocarbon residue containing 6 to 18 carbon atoms and containing an aromatic ring.

15. A thermosetting composition according to claim 14, which the amine is:
- 4,4'-(phenylene-diisopropyl)-bis(2,6-dimethylaniline);
- 4,4'-(phenylene-diisopropyl)-bis(2,6-diethylaniline);
- 4,4'-(phenylene-diisopropyl)-bis(2,6-dipropylaniline);
- 4,4'-(phenylene-diisopropyl)-bis(2,6-diisopropylaniline);
- 4,4'-(phenylene-diisopropyl)-bis(2,6-dimethyl-3-chloroaniline);
- 4,4'-(phenylene-diisopropyl)-bis(2,6-diethyl-3-chloroaniline);
- 4,4'-(phenylene-diisopropyl)-bis(2,6-dipropyl-3-chloroaniline);
- 4,4'-(phenylene-diisopropyl)-bis(2,6-diisopropyl-3-chloroaniline);
- 3,3'-(phenylene-diisopropyl)-bis(2,6-dimethylaniline);
- 3,3'-(phenylene-diisopropyl)-bis(2,6-diethylaniline);
- 3,3'-(phenylene-diisopropyl)-bis(2,6-dipropylaniline);
- 3,3'-(phenylene-diisopropyl)-bis(2,6-dimethyl-3-chloroaniline);
- 3,3'-(phenylene-diisopropyl)-bis(2,6-diethyl-3-chloroaniline);
- 3,3'-(phenylene-diisopropyl)-bis(2,6-dipropyl-3-chloroaniline);
- 3,3'-(phenylene-diisopropyl)-bis(2,6-diisopropylaniline); or
- 3,3'-(phenylene-diisopropyl)-bis(2,6-diisopropyl-3-chloroaniline).

16. A thermosetting composition according to claim 1, characterized in that it comprises at least one epoxy resin formed from at least one polyepoxide containing at least two epoxy groups in its molecule and at least two aromatic polyamines.

17. A metallic or non metallic surface coated with a protective coating comprising a thermosetting composition according to claim 1.

18. A thermosetting composition according to claim 1, wherein said at least one aromatic polyamine is 4,4'-methylene bis(2,6-diethylaniline), and the flow controller is a polyimide.

19. A thermosetting composition according to claim 18, wherein said polyimide is a polyetherimide.

* * * * *